US006511935B2

(12) United States Patent
Job

(10) Patent No.: US 6,511,935 B2
(45) Date of Patent: Jan. 28, 2003

(54) METHODS OF MAKING MAGNESIUM/TRANSITION METAL ALKOXIDE COMPLEXES AND POLYMERIZATION CATALYSTS MADE THEREFROM

(75) Inventor: Robert Charles Job, Bound Brook, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/877,295

(22) Filed: Jun. 8, 2001

(65) Prior Publication Data

US 2001/0051586 A1 Dec. 13, 2001

Related U.S. Application Data

(63) Continuation of application No. 09/395,924, filed on Sep. 14, 1999, now abandoned.
(60) Provisional application No. 60/141,665, filed on Jun. 30, 1999, now abandoned.

(51) Int. Cl.[7] .......................... C08F 4/654; C08F 4/655
(52) U.S. Cl. ..................... 502/132; 502/115; 502/118; 502/119; 526/124.3; 526/124.7
(58) Field of Search ................... 502/115, 118, 502/119, 132; 526/124.3, 124.7

(56) References Cited

U.S. PATENT DOCUMENTS

| | | | |
|---|---|---|---|
| 3,901,863 A | 8/1975 | Berger et al. | 260/88.2 R |
| 4,105,846 A | 8/1978 | Hoff et al. | 526/124 |
| 4,199,476 A | 4/1980 | Melquist et al. | 252/431 R |
| 4,239,650 A | 12/1980 | Franke et al. | 252/429 B |
| 4,518,751 A | 5/1985 | Mizogami et al. | 526/114 |
| 4,525,468 A | 6/1985 | Mack et al. | 502/104 |
| 4,525,554 A | 6/1985 | Tanaka et al. | 526/124 |
| 4,902,761 A | 2/1990 | Suga et al. | |
| 5,034,361 A | 7/1991 | Job et al. | |
| 5,082,907 A | 1/1992 | Job | |
| 5,122,494 A | 6/1992 | Job | 502/125 |
| 5,124,298 A | 6/1992 | Job | 502/127 |
| 5,232,998 A | 8/1993 | Buehler et al. | 526/125 |
| 5,371,157 A | 12/1994 | Job | 526/124 |

FOREIGN PATENT DOCUMENTS

| | | |
|---|---|---|
| EP | 127530 | 12/1984 |
| EP | 0 261 961 | 3/1988 |
| EP | 322938 | 7/1989 |
| EP | 0 474 249 | 3/1992 |
| EP | 703247 | 3/1996 |
| JP | 60096609 | 5/1985 |
| JP | 7145210 | 6/1995 |
| WO | 9415977 | 7/1994 |
| WO | 9506672 | 3/1995 |

*Primary Examiner*—Caixia Lu

(57) ABSTRACT

A method of halogenating a precursor to form a polymerization procatalyst is disclosed whereby a magnesium/transition metal-containing alkoxide complex precursor is contacted with a halogenating agent selected from alkylaluminum halide, $TiX_4$, $SiX_4$, $BX_3$, and $Br_2$, where halide and X are reach respectively a halogen, and when an alkylaluminum halide, $TiX_4$, $SiX_4$, $BX_3$, and $Br_2$ are used as the halogenating agent, they are used together or in combination in a multi-step halogenation. The procatalyst then can be converted to an olefin polymerization catalyst by contacting it with a cocatalyst and optionally a selectivity control agent, and used to polymerize olefins in high yield with desired properties.

18 Claims, No Drawings

METHODS OF MAKING MAGNESIUM/TRANSITION METAL ALKOXIDE COMPLEXES AND POLYMERIZATION CATALYSTS MADE THEREFROM

CROSS-REFERENCE TO RELATED APPLICATIONS

This Application is a Continuation of U.S. Ser. No. 09/395,924, filed Sept. 14, 1999 abandoned, which claims the benefit of U.S. Provisional Application Ser. No. 60/141,665, filed Jun. 30, 1999, which is now abandoned.

BACKGROUND OF THE INVENTION

1. Field of the Invention

The present invention relates to methods of making olefin polymerization catalysts from magnesium, transition metal and halogen-containing olefin polymerization procatalysts, and their use as a catalyst component for the polymerization of olefin monomers. The procatalysts are prepared by halogenating a magnesium and transition metal-containing alkoxide complex, and optionally contacting the halogenated product with an electron donor. The procatalyst then can be converted to an olefin polymerization catalyst by contacting it with a cocatalyst and optionally a selectivity control agent.

2. Description of Related Art

Polymers and copolymers of lower α-olefins, particularly, ethylene, propylene and butylene are widely used throughout the world. These polymeric products are relatively inexpensive to manufacture, and they exhibit a number of commercially useful properties. These polymers are most commonly utilized in the form of highly crystalline solids. During the polymerization process, whether it be by liquid pool, gas phase, slurry phase or any other commonly utilized process, it is beneficial for the polymer particles (and consequently the catalyst particles) to be of a satisfactory shape and size. As examples: denser particles allow for higher hourly production rates; spheroidal particles allow for higher polymer bulk density; narrow particle size distribution allows for better gas phase fluidization. Overly small catalyst and polymer particles (commonly called fines) are also undesirable.

When ethylene is polymerized, the process is less complicated than with higher olefins in that the product type is not greatly influenced by the manner in which the ethylene molecules add to the growing polymeric chain during polymerization. The polymeric product of ethylene does not generally exist in stereoisomeric forms. The simpler catalysts required to effect this polymerization can normally be obtained by straightforward chlorination of a catalyst precursor. If the shape of the catalyst particle and thus the shape of the resulting polymer particle is of importance, the catalyst precursor must be sufficiently robust so that it can withstand the rigors of this chlorination step.

When propylene is polymerized, however, the presence of pendant methyl groups on the polymeric chain provides a possibility of several product types, depending on the steric regularity with which propylene molecules add to the growing chain. Much if not most of the commercial polypropylene results from the stereoregular addition of propylene molecules in a regular head-to-tail manner. The form of polymer having a substantial proportion of random addition of propylene units is termed atactic and this amorphous form is less desirable. If present in a significant proportion, the atactic polymer must be removed through an extraction process to provide a more desirable crystalline material.

These polymers typically are formed by using a polymerization catalyst. The activity of the catalyst is significant in that the more polymer produced per unit weight of catalyst the better. The early titanium, chromium or vanadium catalysts were of low activity and the product contained a significant proportion of catalyst residues. These residues had to be removed in an effort to obtain commercially satisfactory properties.

More recent titanium-based olefin polymerization catalysts are stereoregulating and have sufficient activity to avoid extraction and deashing. These high activity catalysts typically are prepared via chlorination of a magnesium containing precursor, in the presence of an electron donor compound, to form a solid procatalyst that usually contains magnesium, titanium and halide moieties, and comprises additionally a cocatalyst (usually an organoaluminum compound) and an optional selectivity control agent (SCA) for propylene polymerization. The magnesium containing complex is typically referred to as a "precursor", the solid titanium-containing compound typically is referred to as a "procatalyst", the organoaluminum compound, whether complexed or not, usually is referred to as the "cocatalyst" and the third component external electron donor, whether used separately or partially or totally complexed with the organoaluminum compound, is referred to as the "selectivity control agent." Throughout this disclosure, these terms will be used in accordance with the aforementioned designations. As before, if the shape of the catalyst particle and thus the shape of the resulting polymer particle is of importance, the catalyst precursor must be sufficiently robust so that it can withstand the rigors of the chlorination process.

Many chemical combinations of procatalysts, cocatalysts and selectivity control agents are known in the art to produce active catalysts. Through considerable experience, however, certain materials are of greater interest than others. For example, there is significant research in the area of procatalysts, which typically contain some chemical combination of magnesium, titanium tetrachloride and an internal electron donor. These internal electron donors usually are oxygen containing compounds such as tetrahydrofuran and aromatic esters such as ethyl benzoate or ethyl p-toluate. Conventional cocatalysts include an aluminum trialkyl such as triethylaluminum or triisobutylaluminum that is often complexed with a portion of the selectivity control agent (or external electron donor), which also is typically an aromatic ester or an organosilane. Although variations in any of these catalyst components will influence the performance of the resultant catalyst, the component that appears to offer the greatest opportunity for modification to produce greater catalyst activity is the procatalyst.

The literature is rife with disclosures relating to the various known methods of preparing procatalysts. For example, Kioka, et al., U.S. Pat. No. 4,330,649, the disclosure of which is incorporated by reference herein in its entirety, describes a solid catalyst component (procatalyst) that is prepared by heating a soluble magnesium compound such as magnesium chloride with a higher alcohol in the presence of an ester to produce a solution. This solution contains a "precursor" of the procatalyst, which then is added to titanium tetrachloride and an electron donor (internal) to form the procatalyst. A number of United States patents issued to Robert C. Job (and Robert C. Job, et al.,) describe various mechanisms for preparing magnesium-containing, titanium-containing compounds that are useful as precursors for the production of procatalysts that are ultimately useful in preparing catalysts for the polymerization of α-olefins. For example, U.S. Pat. Nos. 5,034,361;

5,082,907; 5,151,399; 5,229,342; 5,106,806; 5,146,028; 5,066,737; 5,122,494, 5,124,298, and 5,077,357, the disclosures of which are incorporated by reference herein in their entirety, disclose various procatalyst precursors. U.S. Pat. No. 5,034,361 discloses solubilizing a magnesium alkoxide in an alkanol solvent by interaction of the magnesium alkoxide compound and certain acidic materials. This magnesium alkoxide then can be used either directly as a magnesium-containing catalyst precursor, or can be reacted with various titanium compounds to produce a magnesium and titanium-containing catalysts precursor.

U.S. Pat. Nos. 5,082,907; 5,151,399; 5,229,342; 5,106,806; 5,146,028; 5,066,737; 5,122,494, 5,124,298, and 5,077,357 disclose various magnesium and titanium-containing catalyst precursors, some of which are prepared by using the aforementioned magnesium alkoxide as a starting material. These precursors are not active polymerization catalysts, and they do not contain any effective amounts of electron donor. Rather, the precursors are used as starting materials in a subsequent conversion to an active procatalyst. Magnesium and titanium-containing procatalysts are formed by chlorinating the magnesium and titanium-containing precursor with a tetravalent titanium halide, an optional hydrocarbon and an optional electron donor. The resulting procatalyst solid then is separated from the reaction slurry (by filtration, precipitation, crystallization, and the like). These procatalysts then are converted to polymerization catalysts by reaction with, for example, an organoaluminum compound and a selectivity control agent. U.S. Pat. Nos. 5,122,494 and 5,371,157, the disclosures of which are incorporated herein by reference in their entirety, disclose treating those various magnesium and titanium-containing catalyst precursors with ethylaluminum dichloride (EADC) or diethylaluminum chloride (DEAC), as chlorinating agents, to obtain procatalysts via a one-step chlorination. Those procatalysts are then converted to polymerization catalysts by reaction with, for example, an organoaluminum compound and a selectivity control agent.

These known polymerization catalysts typically are prepared by contacting the solid reaction product, consisting essentially of magnesium alkoxide, titanium alkoxide and phenoxide (approximately $Mg_3Ti(OR)_8X_2$ where X=OAr), with an alkylaluminum halide. While such a precursor is relatively simple to prepare, and useful for the polymerization of ethylene, they typically are produced in the form of powders which are not satisfactory for a gas phase process and even in slurry process produce deleteriously high fines levels. U.S. Pat. No. 5,124,298 teaches the preparation of a similar magnesium/titanium alkoxide precursor which differs from the one above in having X be primarily halide (instead of phenoxide) and being obtained via a metathesis precipitation reaction process as a controlled morphology (nearly spheroidal) granular material.

Many of the conventional halogenation methods are too rigorous to the extent that they adversely affect the morphology of the solid precursor material thereby resulting in poor morphology catalysts, and ultimately, poor polymer product. In addition, the procatalysts usually are not specifically tailored to control the catalyst decay rate, control the molecular weight distribution of the polymer, or to produce polymer having dissymetric molecular weight distributions. Moreover, many of the methods described in the prior art relate to magnesium and titanium containing complexes, and do not provide the flexibility of making procatalysts from transition metals other than titanium. Finally, the conventional Ziegler-type procatalysts described above all are contacted with relatively inexpensive cocatalysts, such as triethylaluminum, and have not heretofore been used with cocatalysts like aluminoxanes, which typically are employed with metallocene catalysts, to form a polyolefin polymerization catalyst.

SUMMARY OF THE INVENTION

Thus, there exists a need to develop a method of making a procatalyst that does not adversely affect the morphology of the precursor. There also exists a need to develop a method of making a procatalyst that can be converted to an olefin polymerization catalyst capable of producing polymers in high yield, low fines, improved average particle size and increased bulk density. There also exists a need to provide a method of making a substantially spheroidal procatalyst having controlled catalyst decay rates, and a method of making a substantially spheroidal procatalyst capable of making tailored polymer particles having desired molecular weight distributions (narrow, broad, dissimilar, etc.). In addition, there exists a need to develop a method of halogenating a magnesium/transition metal-containing precursor complex that has the flexibility and applicability to a variety of transition metals, and which can be used with a variety of cocatalysts to polymerize olefins. A need also exists to develop a procatalyst and method of making a procatalyst that does not suffer from any of the aforementioned disadvantages.

In accordance with these and other features of the invention, there is provided a method of making a procatalyst including contacting a magnesium/transition metal-containing alkoxide complex with at least one halogenating agent selected from alkylaluminum halide, $TiX_4$, $SiX_4$, $BX_3$, and $Br_2$, where halide and X are each respectively a halogen, preferably chlorine or bromine, and if an alkylaluminum halide, $TiX_4$, $SiX_4$, and/or $Br_2$ are used as the at least one halogenating agent, they are used together with another halogenating agent or in combination with another halogenating agent in a multi-step halogenation.

In accordance with an additional feature of the present invention, there is provided a procatalyst prepared by halogenating the above-mentioned precursor with the above-mentioned halogenating agent, and optional electron donor, where the procatalyst, when converted to a catalyst and used to polymerize at least one olefin, has controlled catalytic decay and can yield polymer having tailored molecular weight distributions.

The invention also provides a high activity olefin polymerization procatalyst that is prepared by the above-mentioned process and which optionally contains an electron donor and a hydrocarbon. The invention additionally provides a high activity olefin polymerization catalyst that comprises: (i) the above-described procatalyst; (ii) an organoaluminum cocatalyst; and optionally, (iii) a selectivity control agent. The invention also provides methods of making each of the above-described procatalysts and catalysts. In addition, the invention provides methods of polymerizing olefins (homopolymers, copolymers, terpolymers, etc.) by contacting an olefin monomer (or monomers) with the above-described high activity olefin polymerization catalyst.

These and other features of the present invention will be readily apparent to those skilled in the art upon reading the detailed description that follows.

DESCRIPTION OF PREFERRED EMBODIMENTS

Throughout this description, the expression "if an alkylaluminum halide, $TiX_4$, $SiX_4$, and $Br_2$ are used as the halogenating agent, they are used together with another halogenating agent or in combination with another halogenating agent in a multi-step halogenation" denotes a method whereby if any of the halogenating agents are used by themselves in one step to halogenate a procatalyst precursor complex, another halogenating agent (same or different) is used in a subsequent step to halogenate a procatalyst precursor complex. This expression also encompasses a method whereby a mixture of one or more of the halogenating agents can be used in one halogenation step, and another agent or mixture of agents (including the same mixture) can be used in a subsequent halogenation. The following are representative examples of possible halogenation treatments:

1. Two consecutive EADC treatments;
2. An EASC treatment followed by EADC;
3. $TiCl_4$ treatment followed by EADC treatment;
4. $BCl_3$ treatment;
5. $SiCl_4$ followed by EADC;
6. mixed $TiCl_4/SiCl_4$ treatment followed by EADC;
7. $SiCl_4$ followed by mixed $EADC/BCl_3$; and
8. $Br_2$ first step followed by EADC.

Other possible configurations within the context of the above expression will be readily apparent to those skilled in the art upon review of this disclosure.

In the present invention, it is preferred that if $TiX_4$ or $SiX_4$ are used as a halogenating agent, they are used in a multi-step halogenation where a different halogenating agent is used in one of the halogenation steps. For example, if $TiCl_4$ or a mixture of $TiCl_4$ and $SiCl_4$ is used in one step, then a different halogenating agent is used in another step of the multi-step halogenation (contact with $TiCl_4$ followed by contact with $SiCl_4$, or vice versa, or contact with $TiCl_4$ followed by contact with EADC, DEAC, and the like). As will be appreciated by those skilled in the art, multi-step halogenation denotes at least two halogenation steps, (preferably two), but more than two steps could also be used.

Throughout this description the term "precursor" and the expression "procatalyst precursor" denotes a solid material that contains magnesium and a transition metal, but does not contain an electron donor, and which can be converted to a "procatalyst" (defined below) by contacting it with a halogenating agent such as alkylaluminum halide or tetravalent titanium halide (preferably $TiCl_4$) and optionally an electron donor. Throughout this description, the term "procatalyst" denotes a solid material that is an active catalyst component, and that can be converted to a polymerization catalyst by contact with an organoaluminum compound (preferably triethyl aluminum (TEAL) and aluminoxane), and an optional external donor, or selectivity control agent.

The present invention contemplates the formation of an olefin polymerization catalyst by contacting at least one halogenating agent with a complex magnesium-containing, transition metal-containing alkoxide compound precursor prepared by reaction of, for example, magnesium alkoxide, a transition metal-containing compound such as titanium tetraalkoxide and a phenolic compound or a halogen-containing compound. Such complex precursor compounds are described, inter alia, in U.S. Pat. Nos. 5,122,494, 5,124,298, and 5,371,157. The complex alkoxide precursors are of somewhat variable stoichiometry but have the general illustrative formula $$Mg_3Tr(OR)_8 X_2$$

wherein Tr is a transition metal selected from those transition metals having an oxidation state of at least +3, and preferably is selected from titanium, zirconium, hafnium, chromium, iron and vanadium, R independently is alkyl of up to 4 carbon atoms inclusive and X independently is a halogen or a monovalent anion derived from a phenolic compound. The resulting catalyst, employed in the presence of or in the absence of a selectivity control agent, is used to polymerize or copolymerize lower α-olefins such as ethylene or propylene. The polyolefin product is produced at a relatively high catalyst productivity and has excellent properties. In addition, the halogenation of the precursor can be conducted to tailor a polyolefin product having a desired molecular weight distribution (broad, narrow, dissimilar, etc.). Skilled artisans are capable of carrying out the halogenation to tailor polyolefin products using the guidelines provided herein.

The complex magnesium-containing, transition metal-containing alkoxide compound can be produced by any of the methods described in U.S. Pat. Nos. 5,122,494, 5,124,298, and 5,371,157, including the modification of substituting the titanium tetraalkoxide with a suitable transition metal containing compound. The complex magnesium-containing, transition metal-containing alkoxide compound preferably can be produced by reacting a magnesium alkoxide, a titanium or a zirconium tetraalkoxide, an optional halide, preferably titanium tetrahalide, and a phenolic compound in the presence of an inert reaction diluent. The diluent then can be removed to produce, as a particulate solid, the complex alkoxide compound. This solid then can be treated with a halogenating agent to produce the olefin polymerization procatalyst of the invention. This procatalyst then can be used, in the optional presence of selectivity control agent, to promote the polymerization of lower α-olefins by polymerization techniques which are largely conventional.

The alkoxide moieties of the magnesium alkoxide are the same as or are different from the alkoxide moieties of the titanium tetraalkoxide or other transition metal containing alkoxides. Moreover, the alkoxide moieties of one metal alkoxide reactant are the same as or are different from the alkoxide moieties of the other metal alkoxide reactant. In part for reasons of complex alkoxide purity, it is preferred that all alkoxide moieties of both metal alkoxides be the same. The preferred alkoxide moieties are methoxide or ethoxide (R is methyl or ethyl) and particularly preferred is ethoxide. Magnesium ethoxide, titanium tetraethoxide and zirconium tetraethoxide are the preferred metal alkoxide reactants for the production of the complex metal alkoxide compound.

The phenolic compound that can be used as a reactant in the production of the complex alkoxide compound preferably is selected from phenol or an activated phenol. By the term "activated phenol" is meant a monohydroxylic phenol of one aromatic ring having aromatic ring substituents other than hydrogen which serve to alter the pKa of the phenolic compound. Such substituent groups are free from active hydrogen atoms and include halogen, e.g., chlorine or bromine, alkyl and particularly alkyl of up to 4 carbon atoms inclusive, and dialkylamino wherein each alkyl has up to 4 carbon atoms inclusive. Suitable substituent groups do not include hydroxy but may include aldehyde. Illustrative of suitable phenolic compounds are phenol, p-cresol, o-cresol, 3-methoxyphenol, 2,6-di-t-butyl-4-methylphenol (BHT), 2,4-diethylphenol, p-chlorophenol, p-bromophenol, 2,4-dichlorophenol, p-dimethylaminophenol, salicyl aldehyde and m-diethylaminophenol.

The contacting of the magnesium alkoxide, transition metal compound, optional halide, and phenolic compound preferably takes place at an elevated temperature in an inert reaction diluent. The reaction diluent is one in which all reactants are at least partially soluble and which does not react with the reactants or the complex alkoxide product. Preferred reaction diluents are hydrocarbon such as isooctane, isopentane or n-heptane, or are halohydrocarbon such as methylene chloride, carbon tetrachloride or chlorobenzene. The contacting preferably takes place at a reaction temperature from about 50° C. to about 90° C. Contacting typically is effected in a suitable reactor and is facilitated by conventional procedures such as shaking, stirring or refluxing. The phenolic compound preferably is provided in a quantity of from about 0.1 mole to about 4 moles per mole of transition metal containing compound (e.g., titanium tetraalkoxide), but preferably in a quantity of from about 0.5 mole to about 2 moles per mole of transition metal. The magnesium alkoxide can be provided in a quantity from about 1.5 mole to about 8 moles per mole of transition metal containing compound (e.g., titanium tetraalkoxide). Preferred quantities of magnesium alkoxide are from about 3 moles to about 6 moles per mole of transition metal containing compound.

The product of the contacting of the magnesium alkoxide, the transition metal containing compound, optional halide, and phenolic compound in the inert reaction diluent is a solution of the complex alkoxide compound in the diluent. To obtain the solid complex alkoxide compound, the complex alkoxide compound is separated from the diluent by any suitable means described in any of the aforementioned patents. The solid product resulting from either modification is the complex alkoxide compound useful as a catalyst component.

The conversion of the complex alkoxide compound to the olefin polymerization catalyst is by treatment with at least one halogenating agent selected from alkylaluminum halide, $TiX_4$, $SiX_4$, $BX_3$, and $Br_2$, where halide and X are each respectively a halogen, preferably chlorine or bromine. Suitable alkylaluminum halides have from 1 to 2 alkyl groups independently of up to 8 carbon atoms and from 2 to 1 halide moieties. The preferred alkylaluminum halides are represented by the formula $$R_nAlY_{3-n}$$

wherein R has the previously stated meaning, (R independently is alkyl of up to 4 carbon atoms inclusive), Y is chlorine or bromine and n is 1 or 2. Illustrative of such alkylaluminum halides are ethylaluminum dichloride (EADC), ethylaluminum sesquichloride (EASC), diethylaluminum chloride (DEAC), diethylaluminum bromide, propylaluminum dibromide, dibutylaluminum chloride and methylaluminum dibromide. In general, the compounds of the above formula wherein n is 2 are preferred as are the compounds wherein R is ethyl. Particularly preferred as alkylaluminum halide is EADC.

Other halogenating agents such as $TiX_4$, $SiX_4$, $BX_3$ and $Br_2$ can be used, where X is any halogen. Preferably, X is chlorine or bromine, and most preferably, X is chlorine. Particularly preferred halogenating agents are $TiCl_4$ and $SiCl_4$.

The reaction of the solid complex alkoxide precursor and the halogenating agent preferably is conducted by contacting the reactants in a multi-step halogenation process. When $BCl_3$ is used as the halogenating agent, a single contact will suffice, although it is preferred to use a multi-step halogenation process. By multi-step halogenation process, it is intended to encompass contacting the solid complex alkoxide precursor more than once with at least one halogenating agent. For example, the solid complex alkoxide precursor can be contacted once with a combination of $TiX_4$ and $SiX_4$, followed by further contact with additional halogenating agent which may be the same or different from the first agent(s).

Insofar as many of the halogenating agents listed above are liquid, a preferred method of contacting is by mixing the halogenating agent halide and the complex alkoxide precursor at an elevated temperature. Suitable contacting temperatures range anywhere from about 20° C. to about 100° C., but preferably from about 35° C. to about 90° C. To insure adequate contacting, a diluent such as a hydrocarbon or halohydrocarbon may be used but in other modifications, no diluent is present during the contacting. Subsequent to the contacting of halogenating agent and the complex alkoxide precursor, the resulting solid typically is washed with light hydrocarbon, e.g., isooctane, to remove unreacted materials. This solid is useful as such as an olefin polymerization catalyst.

The halogenating agent can be provided in any amount sufficient to halogenate the complex alkoxide precursor. Preferably, the halogenating agent is provided in an amount of from about 1 mole to about 150 moles per mole of transition metal of the complex alkoxide precursor. Particularly preferred quantities of halogenating agent range anywhere from about 10 moles to about 30 moles per mole of transition metal.

Instead of, or in addition to using a phenolic compound to prepare the complex alkoxide precursor, any clipping agent species that is capable of assisting in the breakup of a polymeric magnesium alkoxide. Specifically, clipping agents include: (i) those species which, in large excess are capable of dissolving magnesium alkoxides; (ii) large anions; and (iii) those that prevent magnesium alkoxides from polymerizing. Preferably, the clipping agents are selected from HCHO, $CO_2$, $B(OEt)_3$, $SO_2$, $Al(OEt)_3$, $CO_3^=$, $Br^-$, $(O_2COEt)^-$, $Si(OR)_4$, $R'Si(OR)_3$, and $P(OR)_3$. In the above compounds, R and R' represent hydrocarbon groups, preferably alkyl groups, containing from 1–10 carbon atoms, and preferably R and R' are the same or different and are methyl or ethyl. Other agents that release large anions or form large anions in situ (i.e., clipping agent precursors) can be used, such as $MgBr_2$, carbonized magnesium ethoxide (magnesium ethyl carbonate), calcium carbonate, and the like.

Because the complex alkoxide precursor already contains active metal species, it is not necessary that the halogenating agent be a transition metal halide, and if the halogenating agent is a transition metal halide, much less of it can be used. Preferably, the precursor is contacted with a halogenating agent in an amount such that the equivalents of available halide are about 2 to 4 times the sum of 2 times the magnesium equivalents+4 times the titanium equivalents, established by elemental analysis to be contained in the precursor.

The magnesium and transition metal-containing procatalyst serves as one component of a Ziegler-Natta catalyst system where it is contacted with a cocatalyst and optionally, a selectivity control agent. The cocatalyst component employed in the Ziegler-Natta catalyst system may be chosen from any of the known activators of olefin polymerization catalyst systems employing a transition metal halide, but organoaluminum compounds are preferred. Illustrative organoaluminum cocatalysts include trialkylaluminum compounds, alkylaluminum alkoxide compounds alkylaluminoxane compounds and alkylaluminum halide compounds in which each alkyl independently has from 2 to 6 carbon atoms inclusive. The preferred organoaluminum cocatalysts are halide free and particularly preferred are the trialkylaluminum compounds. Such suitable organoaluminum cocatalysts include compounds having the formula Al(R''')$_d$X$_e$H$_f$ wherein: X is F, Cl, Br, I or OR'''', R''' and R'''' are saturated hydrocarbon radicals containing from 1 to 14 carbon atoms, which radicals may be the same or different, and, if desired, substituted with any substituent which is inert under the reaction conditions employed during polymerization, d is 1 to 3, e is 0 to 2, f is 0 or 1, and d+e+f=3. Such cocatalysts can be employed individually or in combination thereof and include compounds such as Al(C$_2$H$_5$)$_3$, Al(C$_2$H$_5$)$_2$Cl, Al$_2$(C$_2$H$_5$)$_3$Cl$_3$, Al(C$_2$H$_5$)$_2$H, Al(C$_2$H$_5$)$_2$(OC$_2$H$_5$), Al(i-C$_4$H$_9$)$_3$, Al(i-C$_4$H$_9$)$_2$H, Al(C$_6$H$_{13}$)$_3$ and Al(C$_8$H$_{17}$)$_3$.

Preferred organoaluminum cocatalysts are triethyl aluminum, triisopropyl aluminum, triisobutyl aluminum and diethylhexyl aluminum. Triethyl aluminum is a preferred trialkyl aluminum cocatalyst.

The organoaluminum cocatalyst also can be an aluminoxane such as methylaluminoxane (MAO) or modified methylaluminoxane (MMAO), or a boron alkyl. The method of preparing aluminoxanes is well known in the art. Aluminoxanes may be in the form of oligomeric linear alkyl aluminoxanes represented by the formula:

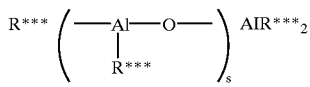

or oligomeric cyclic alkyl aluminoxanes of the formula:

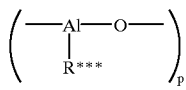

wherein s is 1–40, preferably 10–20; p is 3–40, preferably 3–20; and R* is an alkyl group containing 1 to 12 carbon atoms, preferably methyl or an aryl radical such as a substituted or unsubstituted phenyl or naphthyl radical. In the case of MAO, R* is methyl, whereas in MMAO, R* is a mixture of methyl and C2 to C12 alkyl groups wherein methyl comprises about 20 to 80 percent by weight of the R* group.

The organoaluminum cocatalyst, during formation of the olefin polymerization catalyst, is preferably employed in a molar ratio of aluminum to transition metal of the procatalyst of from about 1:1 to about 150:1, but more preferably in a molar ratio of from about 10:1 to about 100:1.

The final component of the Ziegler-Natta catalyst system is the optional selectivity control agent (SCA), or external electron donor. Typical SCAs are those conventionally employed in conjunction with titanium-based procatalysts and organoaluminum cocatalysts. Illustrative of suitable selectivity control agents are those classes of electron donors employed in procatalyst production as described above as well as organosilane compounds including alkylakoxysilanes and arylalkoxysilanes. Particularly suitable silicon compounds of the invention contain at least one silicon-oxygen-carbon linkage. Suitable silicon compounds include those having the formula R$^1$$_m$SiY$_n$X$_p$ wherein: R$^1$ is a hydrocarbon radical containing from 4 to 20 carbon atoms, Y is —OR$^2$ or —OCOR$^2$ wherein R$^2$ is a hydrocarbon radical containing from 1 to 20 carbon atoms, X is hydrogen or halogen, m is an integer having a value of from 0 to 3, n is an integer having a value of from 1 to 4, p is an integer having a value of from 0 to 1, and preferably 0, and m+n+p=4. R$^1$ should be such that there is at least one non-primary carbon in the alkyl and preferably, that such non-primary carbon is attached directly to the silicon atom. Examples of R$^1$ include cyclopentyl, t-butyl, isopropyl or cyclohexyl. Examples of R$^2$ include ethyl, butyl, isopropyl, phenyl, benzyl and t-butyl. Examples of X are Cl and H.

Each R$^1$ and R$^2$ may be the same or different, and, if desired, substituted with any substituent which is inert under the reaction conditions employed during polymerization. Preferably, R$^2$ contains from 1 to 10 carbon atoms when it is aliphatic and may be sterically hindered or cycloaliphatic, and from 6 to 10 carbon atoms when it is aromatic. Silicon compounds in which two or more silicon atoms are linked to each other by an oxygen atom, i.e., siloxanes or polysiloxanes, may also be employed, provided the requisite silicon-oxygen-carbon linkage is also present. The preferred selectivity control agents are alkylalkoxysilanes such as ethyldiethoxysilane, diisobutyl dimethoxysilane, cyclohexylmethyldimethoxysilane, propyl trimethoxysilane, dicyclohexyl dimethoxysilane, and dicyclopentyl dimethoxysilane. In one modification, the selectivity control agent is a portion of the electron donor added during procatalyst production. In an alternate modification the selectivity control agent is provided at the time of the contacting of procatalyst and cocatalyst. In either modification, the selectivity control agent is provided in a quantity of from 0.1 mole to about 100 moles per mole of transition metsl in the procatalyst. Preferred quantities of selectivity control agent are from about 0.5 mole to about 25 mole per mole of transition metal in the procatalyst.

The olefin polymerization catalyst can be produced by any known procedure of contacting the procatalyst, the cocatalyst and the selectivity control agent. The method of contacting is not critical. In addition, the catalyst components can be precontacted prior to polymerization to form a preactivated catalyst, or the components can be contacted with an olefin monomer to form a prepolymerized catalyst. In one modification, the catalyst components simply are mixed in a suitable reactor and the preformed catalyst thereby produced is introduced into the polymerization reactor when initiation of polymerization is desired. In an alternate modification, the catalyst components are introduced into the polymerization reactor where the catalyst is formed in situ.

The olefin polymerization catalyst may be used in slurry, liquid phase, gas phase and liquid monomer-type reaction systems as are known in the art for polymerizing olefins. Polymerization preferably is conducted in a fluidized bed polymerization reactor, however, by continuously contacting an alpha-olefin having 2 to 8 carbon atoms with the components of the catalyst system, i.e, the solid procatalyst component, cocatalyst and optional SCAs. In accordance with the process, discrete portions of the catalyst components can be continually fed to the reactor in catalytically effective amounts together with the alpha-olefin while the polymer product is continually removed during the continuous process. Fluidized bed reactors suitable for continuously polymerizing alpha-olefins have been previously described and are well known in the art. Fluidized bed reactors useful for this purpose are described, e.g., in U.S. Pat. Nos. 4,302,565, 4,302,566 and 4,303,771, the disclosures of which are incorporated herein by reference. Those skilled in the art are capable of carrying out a fluidized bed polymerization reaction using the guidelines provided herein.

It is preferred sometimes that such fluidized beds are operated using a recycle stream of unreacted monomer from the fluidized bed reactor. In this context, it is preferred to condense at least a portion of the recycle stream. Alternatively, condensation may be induced with a liquid solvent. This is known in the art as operating in "condensing mode." Operating a fluidized bed reactor in condensing mode generally is known in the art and described in, for example, U.S. Pat. Nos. 4,543,399 and 4,588,790, the disclosures of which are incorporated by reference herein in their entirety. The use of condensing mode has been found to lower the amount of xylene solubles in isotactic polypropylene and improve catalyst performance when using the catalyst of the present invention.

The catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000, preferably 50 to 400 psi, most preferably 100 to 300 psi, and temperatures in the range of 30 to 130° C., preferably 65 to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay, or talc may be used, as disclosed in U.S. Pat. No. 4,994,534.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls, most preferably triisobutylaluminum.

The precise procedures and conditions of the polymerization are broadly conventional but the olefin polymerization process, by virtue of the use therein of the polymerization catalyst formed from the solid precursor, provides polyolefin product having a relatively high bulk density in quantities that reflect the relatively high productivity of the olefin polymerization catalyst. In addition, the polymeric products produced in the present invention have a reduced level of fines.

Conventional additives may be included in the process, provided they do not interfere with the operation of the catalyst composition in forming the desired polyolefin.

When hydrogen is used as a chain transfer agent in the process, it is used in amounts varying between about 0.001 to about 10 moles of hydrogen per mole of total monomer feed. Also, as desired for temperature control of the system, any gas inert to the catalyst composition and reactants can also be present in the gas stream.

The polymerization product of the present invention can be any product, homopolymer, copolymer, terpolymer, and the like. Usually, the polymerization product is a homopolymer such as polyethylene or polypropylene, particularly polypropylene. Alternatively, the catalyst and process of the invention are useful in the production of copolymers including copolymers of ethylene and propylene such as ethylene-propylene rubber (EPR) and polypropylene impact copolymers when two or more olefin monomers are supplied to the polymerization process. Those skilled in the art are capable of carrying out suitable polymerization of homopolymers, copolymers, terpolymers, etc., using liquid, slurry or gas phase reaction conditions, using the guidelines provided herein.

Ethylene polymers of the invention include ethylene homopolymers, and interpolymers of ethylene and linear or branched higher alpha-olefins containing 3 to about 20 carbon atoms, with densities ranging from about 0.90 to about 0.95 and melt indices of about 0.1 to 200. Suitable higher alpha-olefins include, for example, propylene, 1-butene, 1-pentene, 1-hexene, 4-methyl-1-pentene, 1-octene, and 3,5,5-trimethyl 1-hexene. Cyclic olefins such as vinyl cyclohexane or norbornene may also be polymerized with the ethylene. Aromatic compounds having vinyl unsaturation, such as styrene and substituted styrenes, may also be included as comonomers. Particularly preferred ethylene polymers comprise ethylene and about 1 to about 40 percent by weight of one or more comonomers described above.

The invention will now be illustrated by examples exemplifying particularly preferred embodiments thereof. Those skilled in the art will appreciate that these examples do not limit the invention but rather serve to more fully describe particularly preferred embodiments.

GLOSSARY

In the the following examples, MI is the melt index (optionally termed $I_2$), reported as grams per 10 minutes, determined in accordance with ASTM D-1238, condition E, at 190° C.

FI is the flow index (optionally termed $I_{21}$), reported as grams per 10 minutes, determined in accordance with ASTM D-1238 condition F, and was measured at ten times the weight used in the melt index test.

MFR is the melt flow ratio, which is the ratio of flow index to melt index. It is related to the molecular weight distribution of the polymer.

Productivity is given in Kg polymer/g procatalyst/hour/100 psi ethylene.

The catalyst decay was determined by monitoring ethylene uptake in 1/min.

The polymer bulk density was determined by weighing 100 ml graduated cylinder reactions carried out under a dry nitrogen atmosphere.

EXAMPLES

Example 1

Halogenation by Contacting First with $TiCl_4$ and then with EADC:

Preparation of Precursor:

In this example, $Mg(OEt)_2$ (6.12 g, 53.5 mmol) and 2.8 g of $Mg(OEt)(O_2COEt)$ (17.5 mmol) were initially slurried into 100 gm of chlorobenzene (90 ml) in an 8 ounce bottle. $Ti(OEt)_4$ (3.76 g, 95%, 15.7 mmol) was then added followed by the addition of 5.2 g of Ethanol. $TiCl_4$ (2.0 g, 10.5 mmol) was added to the stirring slurry. The bottle was placed in a 100° C. oil bath and stirring continued at 440 rpm. By the end of 20 minutes, the reaction appeared to be a nearly water clear translucent slurry with a few granules of magnesium ethoxide remaining. After 70 minutes, the oil bath temperature was increased to 110° C., the bottle cap was removed and the contents subjected to a gentle stream of nitrogen for an hour (to remove any excess Ethanol). The slightly cloudy mixture was transferred to a glovebox and filtered warm. The solids were washed once with chlorobenzene, twice with hexane then dried under moving nitrogen. The yield was 6.0 g of white powder consisting of granules in the 15–20 μm range with a few spheres evident.

Preparation of Polymerization Procatalyst (Halogenation):

Approximately 2.11 g of the precursor obtained above was slurried in 30 ml of hexane. To this slurry was added 4.4 ml of 4.54 M $TiCl_4$/toluene to obtain a yellow slurry. After stirring for 30 minutes at room temperature, the slurry was filtered. The solids were washed twice with hexane and slurried again in 30 ml of hexane. Over about a minute, 18.5 ml of 25% of ethylaluminum dichloride in toluene were added. A dumpiness developed which disappeared upon addition of 25 ml of toluene. After 20 minutes (with occasional stirring) the brown slurry was filtered and the solids washed twice with hexane then dried under moving nitrogen. Drying yielded approximately 1.38 g of yellow-brown powder procatalyst (Ti=2.63%). A polymerization sample was made by slurrying 0.1005 g of this procatalyst in 20 ml of Kaydol brand mineral oil (0.60% solids).

Slurry Polymerization:

To a one liter stainless steel reactor containing 500 ml of hexane and 15 ml of 1-hexene, were added 1024 standard cc of $H_2$ (33 psi partial pressure). Triethylaluminum (0.25 mmol of 1.56 M heptane solution) was injected by syringe. The procatalyst prepared above and slurried in Kaydol oil (1.3 ml of 0.60% slurry) was injected from a 50 ml bomb using ethylene pressure and about 20 ml of hexane. After polymerizing for 30 minutes at 85°, while adding ethylene on demand to keep the total pressure at 156 psi, the reaction was extinguished by injecting 2 ml of isopropanol. Catalyst decay rate had been 47%/20 minutes. The collected polymer was allowed to air dry overnight before characterization. The slurry polymerization obtained about 203 g of polymer of 0.27 g/cc bulk density with melt index of 8.9 dg/min. Productivity was 50.9 Kg PE/g cat/hr/100 psi.

Example 2

Halogenation by Contacting First with EADC and then with Additional EADC

Preparation of Precursor:

Carbonated magnesium ethoxide CMEO (0.6 g: 3.8 mmol), 7.55 g $Mg(OEt)_2$ (66 mmol), 1.74 g of $FeCl_3$ (10.5 mmol) and 1.95 g $MgCl_2.6EtOH$ (5.2 mmol) were mixed in an 8 ounce bottle to which was then added, 100 gm of chlorobenzene (90 ml). The mixture was stirred for a minute, and then 4.11 g of $Ti(OEt)_4$ (95%, 17.1 mmol) was added. The bottle was placed in a 100° oil bath and stirred at 440 rpm. After 27 minutes (96° oil) had elapsed, few of the granules had dissolved and there was some precipitate evident in the brown liquid. After 3 hr, 47 min (97° oil), there were still granules present in a very thick slurry. By 5 hr, 41 min, the slurry was so thick that the stir speed was increased to 550 rpm, and at which time, a gentle nitrogen flow was started. At 6 hr, 39 min, the stir speed was increased to 660 rpm and 40 ml of heptane was added over a period of 15 minutes. The heat was then turned off and the slurry allowed to stir overnight. The mixture was filtered in the glovebox. The solids were washed once with chlorobenzene then twice with hexane and sucked dry to yield 11.8 g of beige powder.

Preparation of Polymerization Procatalyst (Halogenation):

The solid precursor obtained above (2.12 g) was slurred in 15 ml of hexane, and 11 ml of 25% EADC/toluene was added to the slurry over a period of 3 minutes. The initially tan slurry turned to greyish brown. After stirring for 20 minutes the slurry was filtered. The solids were washed twice with hexane and dried under moving nitrogen to give 2.15 g of grey powder. That powder was slurried in 15 ml of hexane, and then 11 ml of 25% EADC/toluene was added over 2 minutes. The initially grey slurry turned brown. After 20 minutes stirring the mixture was filtered. The solids were washed four times with hexane and then dried under moving nitrogen to give 1.57 g of tan powder. Analysis: 3.50% Ti, 3.09% Fe, 12.7% Mg, 4.64% Al. A polymerization sample was made by slurrying 0.100 g of catalyst in 20 ml of Kaydol oil (0.60% solids).

Slurry Polymerizations:

A. To a one liter SS reactor containing 500 ml of hexane and 15 ml of 1-hexene, were added 341 SCC of $H_2$ (13 psi partial pressure). Triethylaluminum (0.25 mmol of 1.56 M heptane solution) was injected by syringe. The polymerization procatalyst prepared above (0.4 ml of 0.60% slurry) was injected from a 50 ml bomb using ethylene pressure and about 20 ml of hexane. After polymerizing for 30 minutes at 85°, while adding ethylene on demand to keep the total pressure at 160 psi, the reaction was extinguished by injecting 2 ml of isopropanol. Catalyst decay rate had been 67%/20 minutes. The collected polymer was allowed to air dry overnight before characterization. Obtained were 181 g of polymer of 0.25 g/cc bulk density with melt index ($I_2$) of 0.204 dg/min and flow index ($I_{21}$) of 6.88 dg/min (MFR= 34). The polymer density was determined to be 0.9459 g/cc. Size exclusion chromatography showed Mw/Mn=7.8.

B. Polymerization with diene comonomer: The polymerization in part A was repeated except that the amount of catalyst slurry was increased to 0.7 ml and 5.0 ml of 5-vinyl-2-norbornene was added to the reactor. Obtained were 181 g of polymer of 0.22 g/cc bulk density with $I_5$ of 0.165 dg/min and flow index ($I_{21}$) of 6.88 dg/min ($I_{21}/I_5$=24, corresponding to an MFR>100). Size exclusion chromatography showed Mw/Mn=10.9.

Example 3

Halogenation by Contacting First with DEAC and then with EADC

Preparation of Precursor:

Mg(OEt)$_2$ (8.6 g, 75 mmol) was slurried into 100 gm of decahydronaphthalene (112 ml), in an 8 ounce bottle, along with 0.27 g triethyl borate (1.87 mmol). After stirring for about one minute, 4.11 g of Ti(OEt)$_4$ (95%, 17.1 mmol) and 1.97 g of TiCl$_4$ (10.4 mmol) were added. The bottle was placed in a 100–110° C. oil bath and stirred for 30 minutes before adding a mixture of 4.0 ml of Ethanol (3.14 g, 68.2 mmol) and 2.0 ml of Butanol (1.61 g, 21.3 mmol). The solids clumped together initially but then quickly dispersed as the granules began to dissolve to produce a homogeneous slurry. The slurry was then stirred for another hour at 540 rpm as all of the granular material appeared to have dissolved and the slurry had the appearance of a cloudy solution. The cap was removed and a gentle nitrogen flow was maintained for an hour (until 6–8% of the solvent had evaporated). The slurry was filtered warm then the solids were washed twice with hexane and dried under moving nitrogen to yield 8.05 g of white powder consisting of spheroidal, uniform sized particles.

Preparation of Polymerization Procatalyst (Halogenation):

About 2.25 g of the above-prepared magnesium and titanium-containing procatalyst precursor was slurried into 20 ml of hexane. To this were added 9 ml of a 25% solution of diethylaluminum chloride (DEAC) in toluene over 3 minutes as the slurry turned to grey. After stirring for 30 minutes the slurry was filtered. The solids were washed twice with hexane and dried under moving nitrogen to produce a powder. That powder then was slurried in 20 ml of hexane, and then 9 ml of a 25% solution of ethylaluminum dichloride (EADC) in toluene was added over 2 minutes. The slurry turned brown. After 10 minutes with occasional stirring the mixture was filtered. The solids were washed twice with hexane, and then dried under moving nitrogen to produce 1.90 g of brown powder procatalyst. A polymerization sample was made by slurrying 0.1076 g of this procatalyst in 20 ml of Kaydol oil (0.62% solids).

Slurry Polymerization:

To a one liter stainless steel reactor, containing 500 ml of hexane and 15 ml of 1-hexene, were added 676 standard cc of H$_2$ (21 psi partial pressure). Triethylaluminum (0.25 mmol of 1.56 M heptane solution) was injected by syringe. The above-prepared procatalyst (1.8 ml of 0.62% slurry of procatalyst in Kaydol oil) was injected from a 50 ml bomb using ethylene pressure and about 20 ml of hexane. After polymerizing for 30 minutes at 85° C., while adding ethylene on demand to keep the total pressure at 156 psi, the reaction was extinguished by injecting 2 ml of isopropanol. The catalyst decay rate had been 41%/20 minutes. The collected polymer was allowed to air dry overnight before characterization. The polymerization produced about 203 g of polymer of 0.25 g/cc bulk density with melt index (I$_2$) of 1.69 dg/min and flow index (I$_{21}$) of 62.4 dg/min (MFR=37).

Example 4

Halogenation by Contacting First with Br$_2$ and then with EADC:

Preparation of Precursor:

Approximately 8.15 g Mg(OEt)$_2$ (71.2 mmol) and 0.6 g magnesium ethyl carbonate (3.8 mmol) were mixed together with 100 gm of chlorobenzene (90 ml), in an 8 ounce bottle, and then 4.11 g of Ti(OEt)$_4$ (95%, 17.1 mmol) were added. After stirring the suspension for a minute, 1.97 g of TiCl$_4$ (10.4 mmol) was added. The 8 ounce bottle was then was placed in a 100° C. oil bath and a mixture of 4.0 ml of Ethanol (3.14 g, 68 mmol) and 1.5 ml of Butanol (1.21 g, 16 mmol) was quickly added. The mixture was stirred for 90 minutes at 440 rpm where it was observed that all of the magnesium ethoxide appeared to have dissolved. The cap was removed from the bottle and the mixture stirred for ~90 minutes under a gentle nitrogen stream to remove Ethanol, (the volume decreased by about 7%). The resulting slurry was transferred to a glovebox and filtered warm. The solids were washed once with chlorobenzene, and then twice with hexane and sucked dry to yield about 10.15 gm of white, uniform opaque spheroids clustered about 35 μm diameter.

Preparation of Polymerization Procatalyst (Halogenation):

Approximately 2.022 g of the precursor prepared above was slurried in 25 ml of hexane, to which was then added a solution of 0.61 g bromine in 10 ml hexane to obtain a dark red slurry which turned colorless after stirring for a few minutes. Toluene (15 ml) was added to the slurry to break up some sticky clumps which had formed. After stirring for 25 minutes at room temperature, the slurry was filtered. The solids were washed twice with hexane and slurried again in 20 ml of hexane. Over about a minute, 19 ml of 25% EADC/toluene were added. After 15 minutes (with occasional stirring) the slurry had turned dark brown. The mixture was filtered and the solids washed twice with hexane then dried under moving nitrogen. Yielded 1.442 g of chocolate brown powder. A polymerization sample was made by slurrying 0.111 g of catalyst in 20 ml of Kaydol oil (0.60% solids).

Polymerization:

To a one liter SS reactor, containing 500 ml of hexane and 15 ml of 1-hexene, were added 664 SCC of H$_2$ (25.6 psi partial pressure). Triethylaluminum (0.25 mmol of 1.56 M heptane solution) was injected by syringe. The polymerization procatalyst prepared above (1.2 ml of 0.60% slurry) was injected from a 50 ml bomb using ethylene pressure and about 20 ml of hexane. After polymerizing for 30 minutes at 85° C., while adding ethylene on demand to keep the total pressure at 157 psi, the reaction was extinguished by injecting 2 ml of isopropanol. Catalyst decay rate had been 0.0%/20 minutes. The collected polymer was allowed to air dry overnight before characterization. Obtained were 96.5 g of polymer of 0.26 g/cc bulk density with melt index of 2.99 dg/min and flow index of 111.7 dg/min (MFR=37).

Example 5

Halogenation by Contacting First with TiCl$_4$ and then with DEAC, and then with TiCl$_4$ Preparation of Precursor:

The remaining examples utilize a magnesium/titanium containing alkoxide precursor as the starting precursor material. This material was prepared by repeating illustrative embodiment II of U.S. Pat. No. 5,124,298 on a scale sufficient to obtain 300 pounds of granular material. Analysis (average of two runs): 12.3% Mg, 7.55% Ti, 60.3% Oet$^-$, 0.93% o-cresol (Cl=11.5% by charge balance).

Preparation of Polymerization Procatalyst (Halogenation):

The precursor prepared above (5.00 g, 7.7 mmol Ti) was stirred with a solution of TiCl$_4$ (16.9 g, 89 mmol) in 152 g of chlorobenzene. After 30 minutes, the mixture was filtered and the solids washed with chlorobenzene. The solids were then stirred with a solution of 42.97 g of 25% DEAC/toluene (89 mmol) in 77.54 g of toluene. After 30 minutes the mixture was filtered and the solids washed first with toluene then with chlorobenzene. That dark brown precipitate then was stirred in a solution of 16.9 g $TiCl_4$ (89 mmol) in 152.1 g of chlorobenzene. After 30 minutes, the mixture was filtered and the solids washed twice with isooctane then dried under moving nitrogen. The yield was 7.68 g of dark brown powder. Analysis: 15.17% Ti, 7.59% Mg, 3.1% Al, 63.45% Cl. A polymerization sample was made by slurrying 1.00 g of catalyst in 20 ml of Kaydol oil (5.3% solids).

Polymerization:

Ethylene gas was started flowing, at a rate of 1090 scc per minute, into a one gallon SS reactor, containing 1375 g of liquid propylene and 45 mmol of $H_2$ (25.6 psi partial pressure). After 10 minutes, the catalyst components consisting of Triethylaluminum (1.05 mmol of 1.56 M heptane solution), dicyclopentyldimethoxy silane (0.18 mmol) and the polymerization procatalyst prepared above (0.30 ml of 5.3% slurry) was injected via high pressure syringe utilizing about 20 ml of isooctane. After polymerizing for 60 minutes at 45° C., with continuous ethylene flow, the reaction was terminated by venting all monomers to atmospheric pressure. The collected polymer was allowed to air dry overnight before characterization. Obtained were 255 g of polymer composed of 1–2 mm diameter balls. NMR analysis determined the polymer to be composed of 40% wt ethylene units and 60% wt propylene units.

Example 6

Halogenation by Contacting First with hot $SiCl_4/TiCl_4$ and then with EADC

Preparation of Polymerization Procatalyst (Halogenation):

To a 10 gal stainless steel reaction/filter vessel were charged 1490 g of the precursor prepared in Example 5 above along with 6.0 kg of hexane. Then a solution composed of 2235 g $SiCl_4$ and 1117 g $TiCl_4$ in 6 kg of toluene was charged at such a rate as to keep the reaction temperature between 25 and 30° (15–20 minutes). The slurry was heated to 60° C. and stirred for 30 minutes and then filtered through an internal filter plate. The solids were washed by reslurrying in a 50/50 mixture of hexane and toluene then isolated by filtration. In a like manner, the solids were then washed twice with hexane and dried under moving nitrogen.

The solids were reslurried into 5 kg of isopentane, and then a solution of 1531 g of EADC in 4.16 kg of toluene plus 2.89 kg of hexane was added at such a rate as to keep the temperature between 25 and 30° (15–20 minutes). After stirring for 30 minutes at 25°, the slurry was filtered. The solids were washed once with 50/50 hexane/toluene then twice with hexane and dried overnight under moving nitrogen. Yield 767 grams of light brown powder. Analysis: 13.0% Mg, 1.96% Ti, 5.53% Al, 61.7% Cl.

Polymerization:

To a one liter SS reactor, containing 500 ml of hexane and 15 ml of 1-hexene, were added 334 SCC of $H_2$ (15.5 psi partial pressure). Triethylaluminum (0.312 mmol of 1.56 M heptane solution) was injected by syringe. The polymerization procatalyst prepared above (1.0 ml of 0.60% slurry) was injected from a 50 ml bomb using ethylene pressure and about 20 ml of hexane. After polymerizing for 30 minutes at 85° C., while adding ethylene on demand to keep the total pressure at 156 psi, the reaction was extinguished by injecting 2 ml of isopropanol. Catalyst decay rate had been 11.5%/20 minutes. The collected polymer was allowed to air dry overnight before characterization. Obtained were 142.8 g of polymer of 0.285 g/cc bulk density with melt index of 0.246 dg/min and flow index of 9.65 dg/min (MFR =39).

Example 7

Halogenation by Contacting First with $SiCl_4/TiCl_4$ Followed by $EADC/BCl_3$:

Preparation of Polymerization Procatalyst (Halogenation):

To a 10 gal stainless steel reaction/filter vessel were charged 1892 g of the precursor prepared in accordance with Example 5 along with 3.5 kg of hexane. Then a solution composed of 3.9 kg $SiCl_4$ and 713 g $TiCl_4$ in 6.6 kg of toluene was charged at such a rate as to keep the reaction temperature between 25 and 30° C. (15–20 minutes). The slurry was stirred for 30 minutes and then filtered through an internal filter plate. The solids were washed by reslurrying in 15 kg of a 50/50 mixture of hexane and toluene then isolated by filtration. In a like manner, the solids were then washed twice with hexane and dried under moving nitrogen. Yield 2472 g of yellow powder. Analysis: 10.7% Mg, 9.82% Ti, 36.2% Cl.

The 10 gal stainless steel reaction/filter vessel was recharged with 1302 g of the yellow powder along with 5 kg of hexane. Then, 7291 g of 25% EADC/toluene was added at such a rate as to keep the temperature between 25 and 30° C. (15 minutes). Then 1175 g of 1M $BCl_3$/heptane was added all at once. After stirring for 30 minutes at 25° C., the slurry was filtered. The solids were washed once with 50/50 hexane/toluene then twice with hexane and dried overnight under moving nitrogen. Yield 1068 grams of dark brown powder. Analysis: 10.7% Mg, 9.62% Ti, 2.38% Al, 56.7% Cl. A polymerization sample was prepared by slurrying 0.100 g of powder in 20 ml of Kaydol mineral oil.

Polymerization:

To a one liter SS reactor, containing 500 ml of hexane and 15 ml of 1-hexene, were added 340 scc of $H_2$ (12.8 psi partial pressure). Triethylaluminum (0.312 mmol of 1.56 M heptane solution) was injected by syringe. The polymerization procatalyst prepared above (1.0 ml of 0.60% slurry) was injected from a 50 ml bomb using ethylene pressure and about 20 ml of hexane. After polymerizing for 30 minutes at 85° C., while adding ethylene on demand to keep the total pressure at 155 psi, the reaction was extinguished by injecting 2 ml of isopropanol. Catalyst decay rate had been 6.3%/20 minutes. The collected polymer was allowed to air dry overnight before characterization. Obtained were 149.6 g of polymer of 0.30 g/cc bulk density with melt index of 0.196 dg/min and flow index of 8.96 dg/min (MFR=46).

As can be seen from the above examples, magnesium and transition metal-containing precursors can be halogenated by a variety of methods to produce highly active polymerization procatalysts. In addition, varying the particular halogenation can produce procatalysts specifically tailored to produce: (a) catalyst having varied decay rates; and (b) polymer having tailored molecular weight distributions. Using the guidelines provided herein, those skilled in the art are capable of tailoring polymerization procatalysts to provide a variety of catalyst decay rates and polymers having a variety of molecular weight distributions.

The inventive examples also provide polymerization procatalysts that retain the excellent morphology of the precursor to thereby generate polymer having fewer fines, as well as a higher bulk density and a lower xylene solubles content. In addition, the halogenation processes of the present invention were effective in preparing polymerization procatalysts that polymerize ethylene and propylene in high yield.

While the invention has been described in detail with reference to particularly preferred embodiments, those skilled in the art appreciate that various modifications can be made without departing from the spirit and scope thereof. All documents referred to herein are incorporated by reference herein in their entirety.

What is claimed is:

1. A method of making a solid composition useful as an olefin polymerization procatalyst, said process comprising:
    a) preparing a solid composition comprising magnesium, titanium, and alkoxide moieties, and optionally halide and/or phenoxide moieties;
    b) chlorinating the solid composition by contacting the solid composition of step a) in the absence of an electron donor with a chlorinating agent selected from the group consisting of $C_{1-8}$ alkylaluminum chlorides, $TiX_4$, $SiX_4$, $BX_3$, and mixtures thereof, wherein X is chloride and recovering the solid chlorinated product;
    c) chlorinating the solid composition a second time by contacting the solid composition of step b) in the absence of an electron donor with a chlorinating agent selected from the group consisting of $C_{1-8}$ alkylaluminum chlorides, $TiX_4$, $SiX_4$, $BX_3$, and mixtures thereof, wherein X is chloride; and
    d) recovering the solid composition,
    provided that the chlorinating agent or mixture used in step b) is different from the chlorinating agent or mixture of chlorinating agents used in step c).

2. The method as claimed in claim 1, wherein the solid composition corresponds to the formula: $Mg_3Ti(OR)_8X_2$, wherein, R is $C_{1-4}$ alkyl and X is halide or phenoxide.

3. The method as claimed in claim 1, wherein after step b) the solid composition is recovered and rinsed with an alkane before contacting with a different chlorinating agent in step c).

4. The method as claimed in claim 3, wherein one chlorinating agent is $TiCl_4$ and the other chlorinating agent is an alkylaluminum halide.

5. The method as claimed in claim 4, wherein the chlorinating agent of step b) comprises $TiCl_4$ and the chlorinating agent of step c) comprises an alkyaluminum halide.

6. A solid composition useful as an olefin polymerization procatalyst prepared in accordance with any one of the methods of claims 1–5.

7. A method of polymerizing an olefin comprising contacting at least one olefin in the presence of the procatalyst, and an organoaluminum cocatalyst compound in the absence of a selectivity control agent, wherein the procatalyst composition is a solid composition according to claim 6.

8. The method according to claim 7 wherein ethylene and 1-hexene are copolymerized.

9. A method of making a solid composition useful as an olefin polymerization procatalyst, said process comprising:
    a) preparing a solid composition comprising magnesium, titanium, and alkoxide moieties, and optionally halide and/or phenoxide moieties;
    b) chlorinating the solid composition by contacting the solid composition of step a) in the absence of an electron donor with a chlorinating agent selected from the group consisting of $C_{1-8}$ alkylaluminum chlorides, $TiX_4$, $SiX_4$, $BX_3$, and mixtures thereof, wherein X is chloride and recovering the solid chlorinated product;
    c) chlorinating the solid composition a second time by contacting the solid composition of step b) in the absence of an electron donor with a chlorinating agent selected from the group consisting of $C_{1-8}$ alkylaluminum chlorides, $TiX_4$, $SiX_4$, $BX_3$, and mixtures thereof, wherein X is chloride; and
    d) recovering the solid composition,
    with the proviso that in at least one of halogenation steps b) or c) the halogenating agent comprises ethylaluminum dichloride.

10. The method as claimed in claim 9, wherein the solid composition corresponds to the formula: $Mg_3Ti(OR)_8X_2$, wherein, R is $C_{1-4}$ alkyl, and X is halide or phenoxide.

11. The method as claimed in claim 9, wherein the chlorinating agent of step b) comprises $TiCl_4$ and the chlorinating agent of step c) comprises an alkylaluminum dihalide.

12. The method as claimed in claim 11, wherein after step b) the solid composition is recovered and rinsed with an alkane, before contacting with a different chlorinating agent in step c).

13. The method as claimed in claim 12, wherein one chlorinating agent is $TiCl_4$ and the other chlorinating agent is ethylaluminum dichloride.

14. A solid composition useful as an olefin polymerization procatalyst prepared in accordance with any one of the methods of claims 9–13.

15. A method of polymerizing an olefin comprising contacting at least one olefm in the presence of a procatalyst, and an organoaluminum cocatalyst compound in the absence of a selectivity control agent, wherein the procatalyst composition is a solid composition according to claim 14.

16. A method according to claim 15 wherein ethylene and 1-hexene are copolymerized.

17. A method according to claim 15 wherein the organoaluminum cocatalyst compound is an alumoxane.

18. A method according to claim 7 wherein the organoaluminum cocatalyst compound is an alumoxane.

* * * * *